G. O. SOLLOM.
STRAW SPREADER.
APPLICATION FILED JUNE 11, 1913.

1,197,156.

Patented Sept. 5, 1916.
2 SHEETS—SHEET 1.

WITNESSES:
Jos. A. Ryan
May Barnes.

INVENTOR
Gustav O. Sollom
BY George W. Sues
ATTORNEY

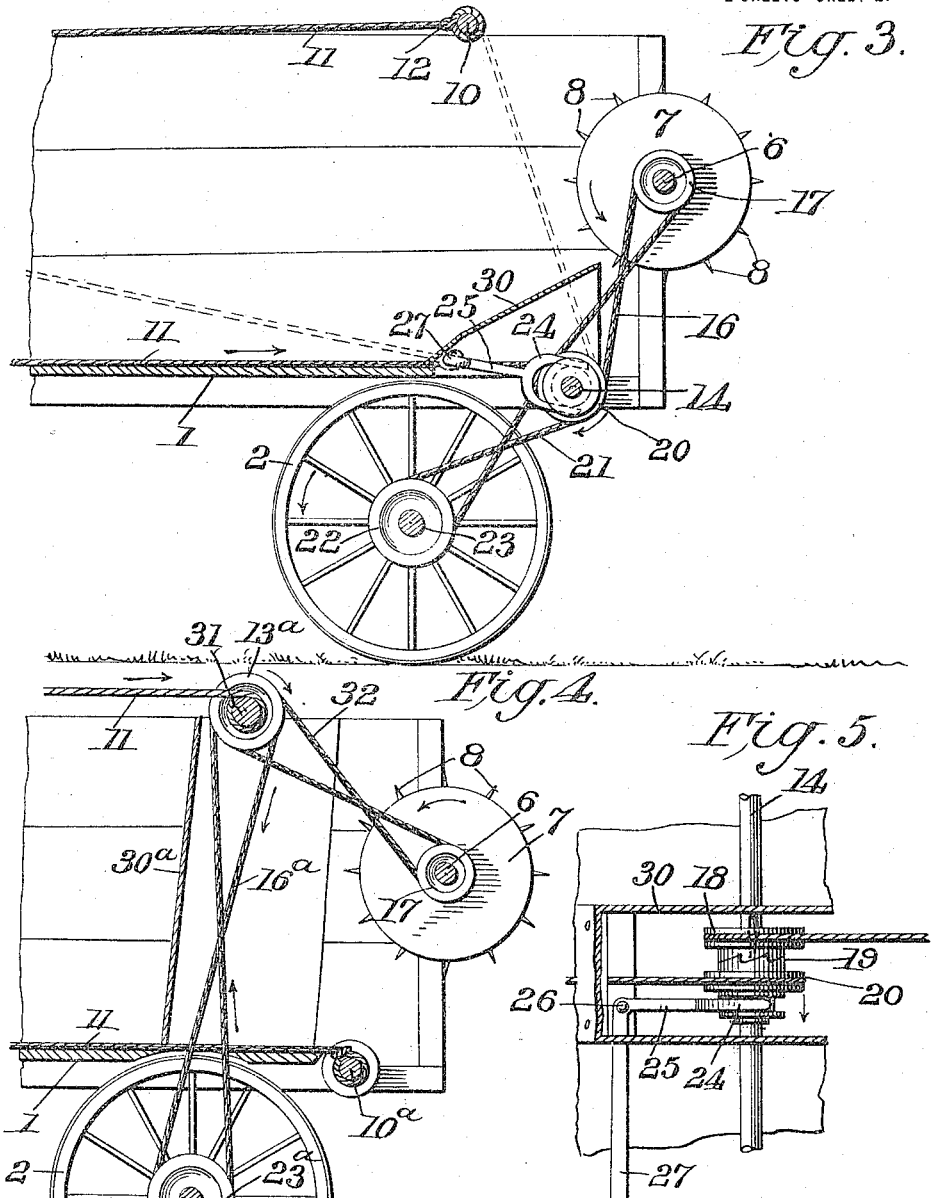

UNITED STATES PATENT OFFICE.

GUSTAV O. SOLLOM, OF REYNOLDS, NORTH DAKOTA.

STRAW-SPREADER.

1,197,156.              Specification of Letters Patent.         Patented Sept. 5, 1916.

Application filed June 11, 1913.   Serial No. 773,057.

*To all whom it may concern:*

Be it known that I, GUSTAV O. SOLLOM, a citizen of the United States, and a resident of Reynolds, in the county of Grand Forks and State of North Dakota, have invented certain new and useful Improvements in Straw-Spreaders, of which the following is a specification, reference being had to the accompanying drawings.

This invention relates to straw spreaders and dump racks, designed for the purpose of distributing straw upon the surface of the ground in sufficient quantities to be plowed under to serve as a mulch for enriching the ground.

Another object of the invention is to provide a combined straw spreader and dump rack which can be readily converted from a straw spreader to a dump rack by removing certain parts of the machine.

In certain parts of the country generally small grains are raised in great quantities, the surplus straw is burned in heaps left by the thresher and the places where the straw is burned produces a residue of ashes which is detrimental to the soil at these places. And in the course of successive years of such farming and burning of the straw the fields become dotted with sterile areas.

My invention is designed for the purpose of distributing the straw over a larger area so that it can be plowed under and utilized to enrich the soil sufficiently without rendering it sterile by over-fertilization.

Figure 1:
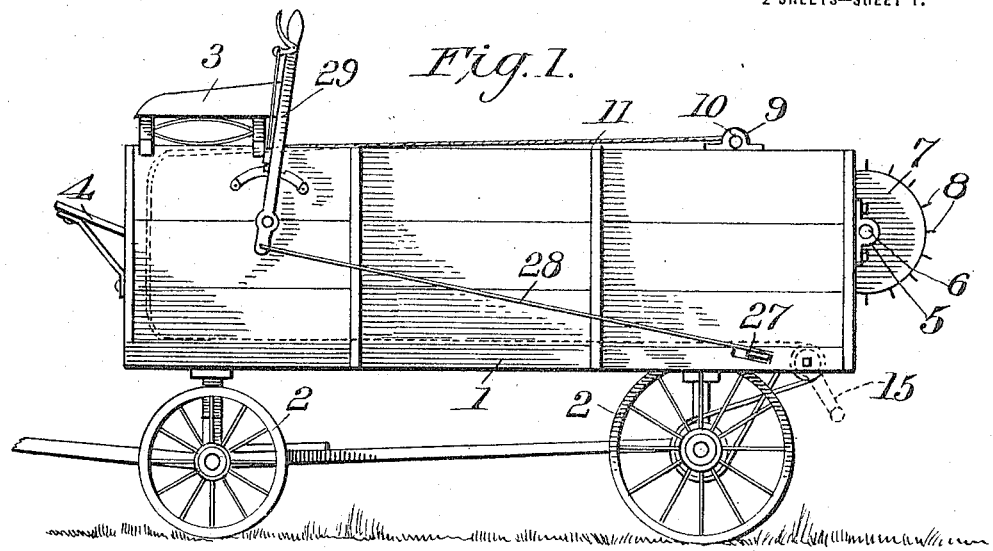
Figure 2:
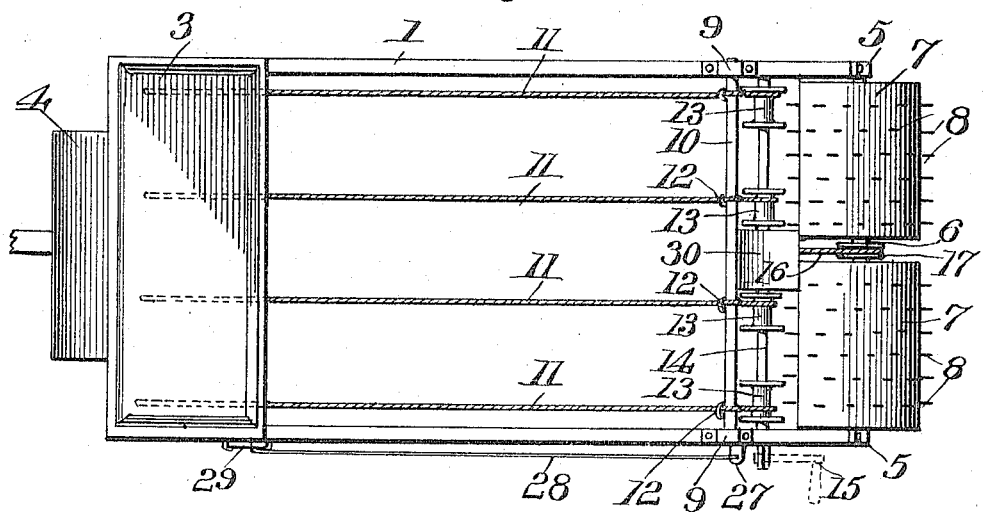

The objects and advantages above referred to may be accomplished by means of the construction illustrated in the accompanying drawings, in which:

Figure 1 is a side elevation of a combined straw spreader and dump rack made in accordance with my invention; Fig. 2 is a top plan view of the same; Fig. 3 is a longitudinal sectional view of the rear end of the spreader; Fig. 4 is a similar view of a slight modification; Fig. 5 is a horizontal sectional view taken through the shield for covering the clutch.

Referring to the drawings, the numeral 1 designates the body portion or box of the vehicle which may be utilized as a rack for containing and dumping various materials. This rack is mounted on wheels 2 and is provided with a driver's seat 3 and with a foot rest 4.

As shown in the drawings, the rack is open at its rear end and mounted in suitable bearings 5. At opposite sides of the rear end of said rack is a drum shaft 6 on which are mounted two drums or beaters 7 provided with a series of radial pins or spikes 8. Mounted in keepers 9 at the top of the box or rack is a bar 10. Connected at equal distances apart to said shaft 10 are drag ropes or cables 11, the ends of said cables being passed around the bar 10 and knotted as shown more clearly at 12 in Fig. 3. These ropes or cables pass to the front of the rack and down to encircle the load of straw within the rack and thence at the bottom loop or extend backward to the rear end of the vehicle around spools 13 spaced apart and fixed to a winding shaft 14 journaled at its ends in the sides of the rack. The ropes or cables 11 extend around the spools 13 and are adapted to be wound on said spools by means of a crank 15 on the projecting end of the shaft 14 when the machine is converted into a dumping rack. When the machine is to be used for spreading straw over the surface of the ground, a belt or band 16 is passed around a grooved pulley 17 on the shaft 6 and from thence crossed and passed around a clutch pulley 18 which is splined to the shaft 6 and forms one member of a clutch, as shown in Fig. 5. The companion member of the clutch includes a collar 19 provided with a grooved pulley 20 and a belt or band 21 surrounds the grooved pulley 20 and is crossed and passed around a grooved pulley 22 on one of the rear wheels. The clutch collar 19 is slidably and rotatably mounted upon the winding shaft 14 and is operated by means of a yoke 24 having a shank 25 pivoted at 26 and provided with an integral angular member 27 to which is connected a wire or rod 28 extending to a lever 29 pivoted at the side of the body of the vehicle in reach of the driver sitting on the seat 3. In order to protect the clutch from interference by the straw or other material loaded into the vehicle, I have provided a guard or shield 30 which extends over the parts of the clutch. The keying of the clutch 18 to the shaft 14 will not interfere with the unloading of the straw by means of the hand wheel 15, when the cylinder 7 and its driving mechanism is removed.

As shown in Fig. 4, the winding shaft 31 is mounted at the top of the rack and the shaft 10$^a$ is secured to the bottom thereof. In this construction a belt or band 32 extends around the pulley 17 between the drums or beaters 7 and from thence is crossed and passed around a grooved pulley 13ᵃ. A belt 16ᵃ is passed around a pulley on the shaft 31 and is crossed and extends around a grooved pulley 22ᵃ on the shaft 23. A guard 30ᵃ protects the belting and gearing from clogging by the straw in the rack during the unloading process.

The operation of my invention may be briefly described as follows: The straw is placed in the rack on top of the lower layers of the ropes or cables 11 and when it is desired to distribute the load the clutch is engaged by movement of the lever 29. The straw is fed out evenly and distributed by means of the drums 7. If it is desired to dump the load at one place, the crank 15 is operated to pull the ropes or cables 11 toward the rear end of the rack and with it the load of straw. When it is desired to use the vehicle body as a dumping rack the shaft 14 and the drums 7 may be readily removed. The construction shown in Fig. 4 merely reverses the winding mechanism to the upper portion instead of the lower portion of the rack.

My invention is simple in construction, is reliable and efficient in use, can be readily converted from a distributing machine for the straw to a dumping rack for various purposes about the farm.

I claim:

1. In combination in a device of the character described of a wagon box, wheels supporting the rear end of said box, a bar secured to said wagon box, a winding shaft at the lower rear end of said box, a plurality of drag ropes having one end secured to said bar and the other end to said winding shaft, a drum secured to the rear end of said wagon box above said winding shaft, pins projecting from said drum, a pulley secured to said drum, and means to rotate said winding shaft and said drum, as, and in the manner set forth.

2. The combination in a device of the character described, of a wagon box opened at its rear end, wheels supporting the rear end of said wagon box, a bar secured to said wagon box, a winding shaft at the lower rear end of said box, a plurality of drag ropes having one end secured to said bar and the other end to said winding shaft, a drum located above said winding shaft, pins projecting from said drum, a pulley secured to said drum, a clutch pulley fixed to said winding shaft, a cross-belt passing over said pulleys, a belt pulley secured to one of said wheels, a clutch collar having a connected pulley rotatably and slidably mounted on said winding shaft said clutch collar and clutch pulley arranged for coaction, a cross-belt passing over said wheel pulley and clutch collar pulley, and means to actuate said clutch collar.

In testimony whereof I affix my signature, in the presence of two witnesses.

GUSTAV O. SOLLOM.

Witnesses:
O. K. LAGESON,
OLE T. SOLLOM.

Copies of this patent may be obtained for five cents each, by addressing the "Commissioner of Patents, Washington, D. C."